United States Patent [19]
Yanagidate et al.

[11] Patent Number: 6,128,664
[45] Date of Patent: Oct. 3, 2000

[54] ADDRESS-TRANSLATING CONNECTION DEVICE

[75] Inventors: Kazuhiko Yanagidate; Teruo Tobe, both of Kawasaki, Japan

[73] Assignee: Fujitsu Limited, Kanagawa, Japan

[21] Appl. No.: 09/047,152

[22] Filed: Mar. 24, 1998

[30]  Foreign Application Priority Data

Oct. 20, 1997 [JP] Japan .................................. 9-286644

[51] Int. Cl.⁷ ............................. G06F 13/38; G06F 15/17
[52] U.S. Cl. ....................... 709/228; 709/200; 711/209; 370/389; 395/417
[58] Field of Search .................................. 395/417, 200; 370/389; 711/209, 206; 709/246, 200, 228

[56]  References Cited

U.S. PATENT DOCUMENTS

| | | | |
|---|---|---|---|
| 5,754,818 | 5/1998 | Mohamed .............................. | 395/417 |
| 5,793,763 | 8/1998 | Mayes et al. ........................... | 370/389 |
| 5,815,664 | 9/1998 | Asano .................................... | 395/200 |
| 5,822,785 | 10/1998 | Ikeda et al. ............................. | 711/209 |
| 5,923,847 | 7/1999 | Hagersten et al. ...................... | 395/200 |
| 5,928,333 | 7/1999 | Landfield et al. ....................... | 395/200 |
| 5,940,870 | 8/1999 | Chi et al. ................................ | 711/206 |
| 5,958,018 | 9/1999 | Eng et al. ............................... | 709/246 |

FOREIGN PATENT DOCUMENTS

| | | |
|---|---|---|
| 8194657 | 7/1996 | Japan . |
| 9098190 | 4/1997 | Japan . |

*Primary Examiner*—Frank J. Asta
*Assistant Examiner*—Farzaneh Farahi
*Attorney, Agent, or Firm*—Helfgott & Karas, P C.

[57]  ABSTRACT

An address-translating connection device which makes it possible to dynamically assign an IP address to a private address when a connection is made to inside of a LAN from outside. When an inquiry made by designating a host name as to a global address of the same is received from the first network, a private address-retrieving device looks up a host-name/private-address correlation storage device to retrieve a private address correlated to the designated host name. When a determining device determines that the address-correlation storage/translation device does not store a global address correlated to the retrieved private address, a storage device extracts an available one of global addresses to correlate the available global address to the retrieved private address, and cause the address-correlation storage/translation device to store therein the addresses correlated to each other. At the same time, a first notifying device sends out into the first network a reply notifying the global address stored.

4 Claims, 7 Drawing Sheets

ADDRESS-TRANSLATING CONNECTION DEVICE

BACKGROUND OF THE INVENTION

1. Field of the Invention

The present invention relates to an address-translating connection device, and more particularly, to an address-translating connection device which is required in connecting a Local Area Network (LAN) using private addresses to a network using global addresses. This address-translating connection device translates network addresses for packet communication between the two types of networks.

2. Description of the Related Art

Communications through the Internet are carried out by Transmission Control Protocol/Internet Protocol (TCP/IP) by using public Internet Protocol (IP) addresses assigned to respective terminals. The public IP addresses are global addresses which are uniquely assigned to computers connected to the Internet which is comprised of a large number of networks connected to each other. Due to the addressing scheme used for IP addresses there are a limited number of available addresses. With the current rate of growth in machines connected to the Internet, it will not be long until the pool of remaining available addresses will be exhausted.

However, within each LAN, private IP addresses can be used. RFC (Request for Comments) 1597 defines "the private IP addresses" as IP addresses "10.0.0.0 to 10.255.255.255, 172.16.0.0 to 172.31.255.255, and 192.168.0.0 to 192.168.255.255", which can be freely assigned to computers inside each LAN (hereinafter, "the public IP addresses" will be simply referred to as "the IP addresses" while "the private IP addresses" as "the private addresses"). Since the same private address used in one LAN can be used within another LAN, the shortage of available global IP addressees is mitigated. However, the private addressees cannot be used outside LANs, since the same address used in one LAN can be also used in another LAN.

As described above, in the global network using IP addresses, the private addresses cannot be used in the address field within a packet. When a terminal having an IP address assigned thereto communicates with another having a private address assigned thereto, an address translation is required at an intermediate point of the communication path.

Conventionally, when a terminal having a private address assigned thereto within a LAN intends to communicate via the Internet with another terminal using a global IP address, an address-translating device is required to assign an IP address to the internal or sender terminal from the pool of IP addresses available to the LAN when the internal terminal logs on to the Internet, and to maintain a table that correlates the private address of the internal terminal to the assigned IP address of the same. Data is sent out to the receiver or external terminal using the assigned IP address of the internal terminal as the sender address. When receiving data from the external terminal connected to the Internet, the address-translating device carries out address translation with reference to the stored table of the correlation between the assigned IP address and the private address. This method enables an IP address to be dynamically assigned to a private address of an internal terminal within a LAN, so that the terminal can communicate with an external terminal outside of the LAN.

When an external terminal outside of the LAN intends to communicate with an internal terminal having a private address within the LAN, the address-translating device translates an IP address in a packet from the external terminal to the private address of the internal terminal, which is fixedly correlated beforehand to the IP address, to thereby permit the external terminal to communicate with the internal terminal.

However, in the case of external terminals intending to communicate with internal terminals within the LAN, the IP addresses assigned or available to the LAN are fixedly correlated beforehand to respective private addresses within the LAN, and hence the number of internal terminals within the LAN with which external terminals can communicate is limited to the number of the IP addresses available to the LAN.

Conventionally, the Dynamic Host Configuration Protocol (DHCP) system dynamically assigns IP addresses to terminals logged on to the LAN. The DHCP system is cooperative with the Domain Name System (DNS) to realize a function that the DNS server returns an IP address dynamically assigned to an internal terminal in response to an inquiry as to the IP address. However, this function is not cooperative with an address translation capability that is implemented using a Network Address Translator (NAT), a PROXY or the like. More specifically, the DHCP and DNS in cooperation can neither carry out updating of the address translation table employed in the address translation, nor assign an IP address to an internal terminal when the DNS server is inquired as to the IP address of the internal terminal.

SUMMARY OF THE INVENTION

It is an object of the invention to provide an address-translating connection device which is capable of dynamically assigning an IP address to a private address of a terminal within a LAN, when an external terminal connects to the terminal within the LAN.

To accomplish the above object, according to the present invention, there is provided an address-translating connection device arranged between a first network using global addresses and a second network using private addresses.

This address-translating connection device comprises host-name/private-address correlation storage means for correlating host names of terminals located on the second network to private addresses assigned to the terminals, respectively, and storing therein the host names and the private addresses correlated to each other; global address control means for keeping track of availability of each of global addresses allocated to the second network; address correlation/storage/translation means for correlating ones of the private addresses assigned to the terminals located on the second network respectively to ones of the global addresses allocated to the second network, and storing therein the ones of the private addresses and the ones of the global addresses correlated to each other; private address-retrieving means for looking up the host-name/private-address correlation storage means to retrieve one of the private addresses correlated to one of the host names, when an inquiry made by designating the one of the host names as to one of the global addresses is received from the first network; determining means for looking up the address correlation/storage/translation means to determine whether or not the address correlation/storage/translation means stores one of the global addresses which is correlated to the one of the private addresses retrieved by the private address-retrieving means; storage-effecting means for looking up the global address control means to retrieve one of the global addresses which is available, correlating the one of the private addresses retrieved by the private address-retrieving means to the one of the global addresses which is available and retrieved, and causing the address correlation/storage/translation means to store therein the one of the private addresses and the one of the global addresses, which are correlated to each other, when the determining means has determined that the address correlation/storage/translation means does not stores the one of the global addresses which is correlated to the one of the private addresses retrieved; and first notifying means for sending out into the first network a reply notifying the one of the global addresses which is caused to be stored in the address correlation/storage/translation means by the storage-effecting means.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Now, the invention will be described with reference to the drawings showing a preferred embodiment thereof.

Figure 1:
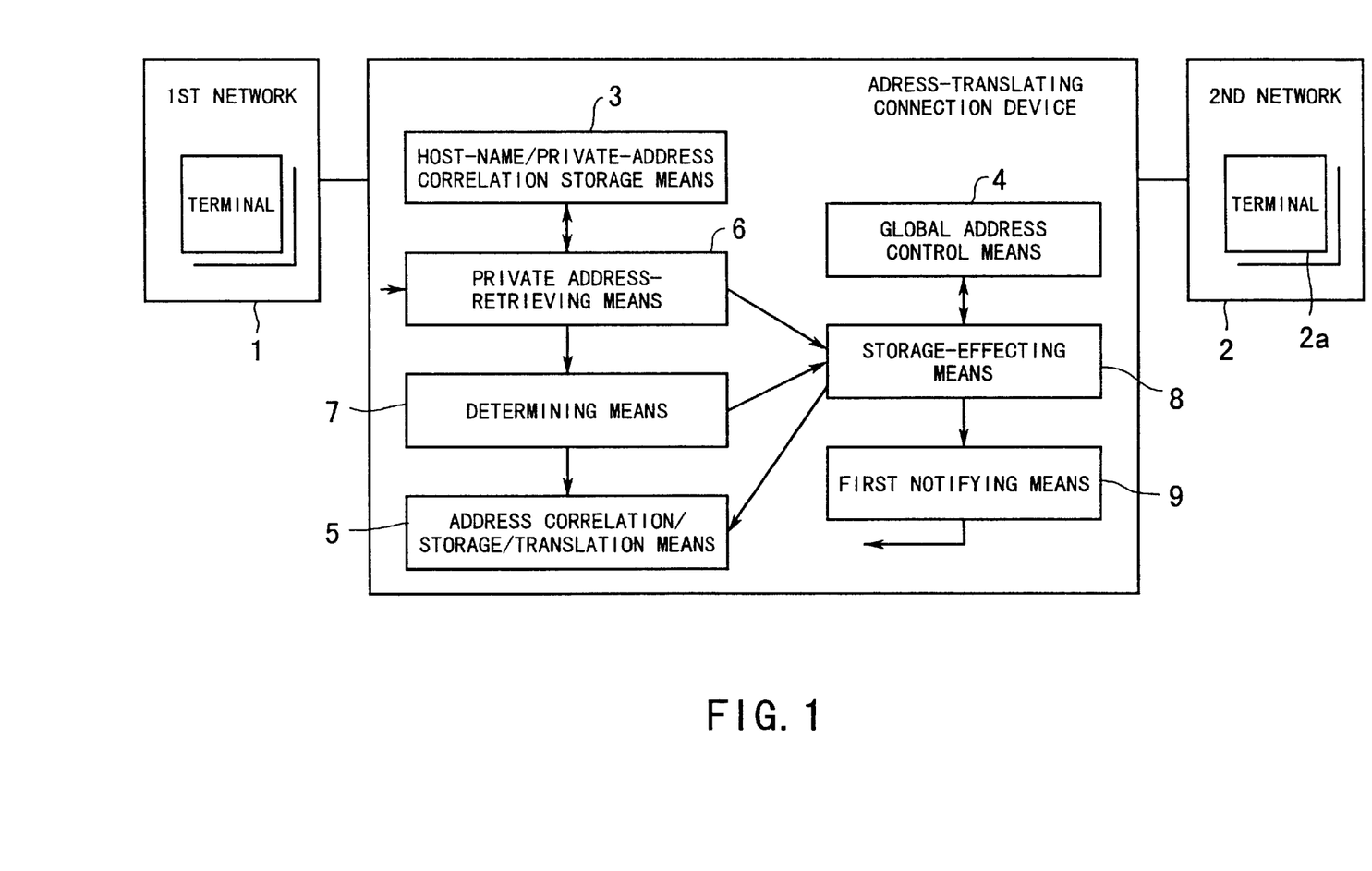
FIG. 1 is an explanatory view for explaining principles of the invention.

Referring first to FIG. 1, the principle of an address-translating connection device according to the invention is explained. The address-translating connection device is comprised of a host-name/private-address correlation storage means 3 for correlating a host name of a terminal 2a located on a second network 2 to a private address assigned to the terminal 2a and storing therein the host name and the private address correlated to each other, global address control means 4 for keeping track of the availability of each of the global addresses assigned to the second network 2, address correlation/storage/translation means 5 for correlating the private address of the terminal 2a located on the second network 2 to one of the global addresses assigned to the second network 2 and storing the correlated addresses therein, private address-retrieving means 6 for looking up the host-name/private-address correlation storage means 3 to retrieve a private address corresponding to a host name designated in an inquiry as to a global address received from a first network, determining means 7 for determining whether or not the address correlation/storage/translation means 5 stores a global address correlated to the private address retrieved by the private address-retrieving means 6, storage-effecting means 8 for looking up the global address control means 4 to retrieve an available global address, and correlating the private address retrieved by the private address-retrieving means 6 to the available global address retrieved to cause the address correlation/storage/translation means 5 to store therein the private address and the global address correlated to each other when the determining means 7 has determined that the address correlation/storage/translation means 5 does not store the global address correlated to the retrieved private address, and first notifying means 8 for sending out into the first network 1 a reply notifying the global address caused to be stored in the address correlation/storage/translation means 5 by the storage-effecting means 8.

When the address-translating connection device constructed as above receives from the first network 1 employing global addresses an inquiry as to a global address of an internal terminal located on the second network 2 which is made by designating a host name of the internal terminal, the private address-retrieving means 6 looks up the host-name/private-address correlation storage means 3 to retrieve a private address correlated to the designated host name. The second network 2 includes a plurality of terminals located thereon each of which has a host name and a private address assigned thereto. The host-name/private-address correlation storage means 3 stores in advance the host names of the terminals on the second network 2 and the respective private addresses of the terminals in a correlated manner.

When the private address-retrieving means 6 has retrieved a private address e.g. of the terminal 2a, then the determining means 7 looks up the address correlation/storage/translation means 5 to determine whether or not the address correlation/storage/translation means 5 stores a global address correlated to the retrieved private address. Initially, no global address correlated to the private address is stored in the address correlation/storage/translation means 5. When the determining means 7 determines that the address correlation/storage/translation means 5 stores no global address correlated to the retrieved private address, the storage-effecting means 8 looks up the global address control means 4 to retrieve an available global address. Normally, the global address control means 4 stores a plurality of global addresses allocated to the second network 2 together with availability of each of the global addresses. At this time, one global address which is available, i.e. not used at this time point for communications, is extracted.

The storage-effecting means 8 correlates the extracted available global address to the private address of the terminal 2a retrieved by the private address-retrieving means 6 and stores the correlated addresses in the address correlation/storage/translation means 5. At the same time, the first notifying means 9 sends out into the first network 1 a reply notifying the global address correlated to the private address of the terminal 2a.

This enables a request to be made from the first network to the address-translating connection device for connection to the terminal 2a by using the notified global address, and according to the request, the address-translating connection device looks up the address correlation/storage/translation means 5 to obtain the private address, whereby connection from the first network 1 to the terminal 2a on the second network 2 is made possible.

As described above, when a connection is made from the first network 1 to one of terminals on the second network 2, the address-translating connection device dynamically assigns one of the global addresses allocated to the second network 2 to a private address of the one of the terminals on the second network 2. Therefore, the number of terminals on the second network to which connection can be made from the first network 1 at all is not limited to the number of global addresses allocated to the second network. This realizes efficient use of address resources.

Now, the embodiment of the invention will be described in further detail.

Figure 2:
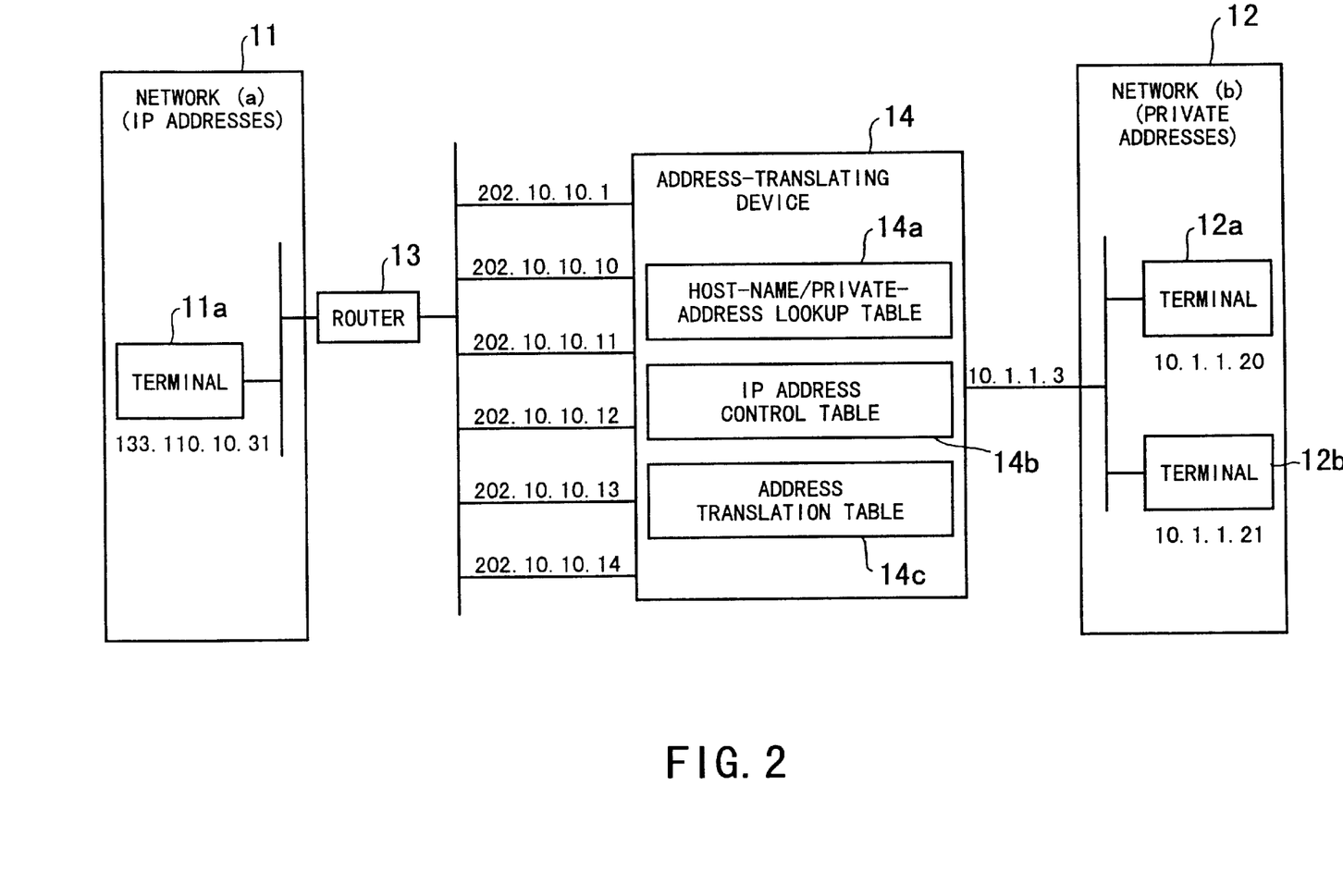
FIG. 2 is a view showing the whole network including an address-translating connection device according to the invention.

FIG. 2 shows the whole network including the address-translating connection device according to the invention. More specifically, this network is comprised of a network (a) 11 and a network (b) 12. At a boundary of the two networks, a router 13 and an address-translating device 14 exist. The network 11 is the Internet which uses IP addresses. For example, a terminal 11a is located on the network 11 and an IP address e.g. of "133.110.10.31" is assigned thereto. The network 12 is a LAN using private addresses for communications between internal terminals within the LAN. For example, terminals 12a, 12b are located on the network 12, with a private address of "10.1.1.20" assigned to the terminal 12a and a private address of "10.1.1.21" assigned to the terminal 12b.

The address-translating device 14 is implemented by a processor comprised of a CPU, and a storage device, such as a ROM and a RAM. The storage device stores therein a host-name/private-address lookup table 14a, an IP address control table 14b, and an address translation table 14c. The processing operation of the processor realizes the above-mentioned means within the address-translating connection device shown in FIG. 1.

On the router 13 side of the address-translating device 14, there are provided network interfaces corresponding to respective IP addresses allocated to the network 12, which are e.g. "202.10.10.1, 202.10.10.10, 202.10.10.11, 202.10.10.12, 202.10.10.13, 202.10.10.14". On the network 12 side of the address-translating device 14, there is provided a network interface corresponding e.g. to a private address "10.1.1.3".

Figure 3:
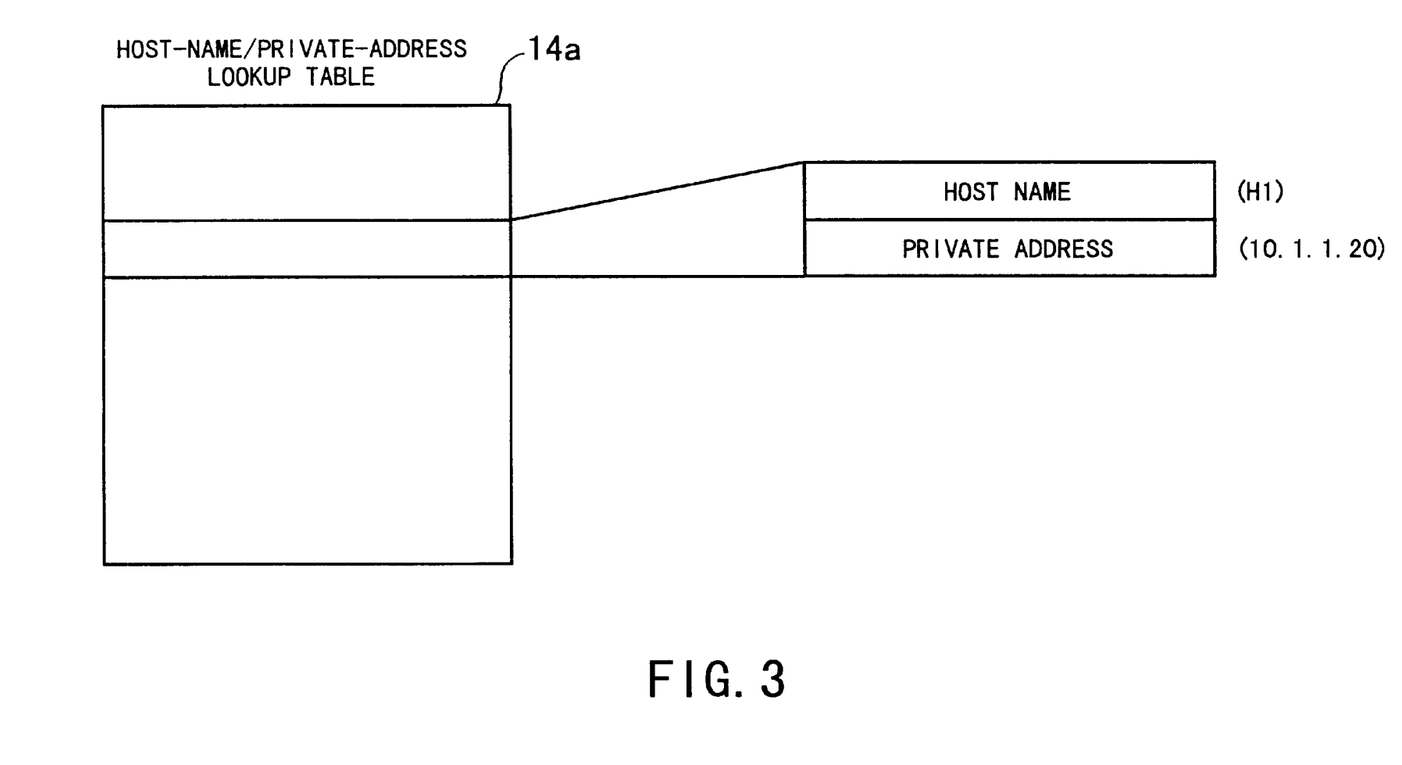
FIG. 3 is a diagram showing internal construction of a host-name/private-address lookup table.

FIG. 3 shows internal construction of the host-name/private-address lookup table 14a. More specifically, the host-name/private-address lookup table 14a is comprised of areas for the respective terminals 12a, 12b located on the network 12. Each area stores a host name and a private address of a corresponding terminal. For instance, assuming that the terminal 12a has a host name of "H1", an area of the host-name/private-address lookup table 14a for the terminal 12a stores the host name "H1" and the private address of "10.1.1.20".

It should be noted that there can be a case where a terminal on the network 12 has an IP address assigned thereto, and in such a case, an area of the host-name/private-address lookup table 14a for storing its private address stores the IP address. Further, it should be noted that the term "IP address" according to the general definition includes in its meaning "a private address", in the present embodiment, however, the term "IP address" is used for designating only a global or public address uniquely defined.

Figure 4:
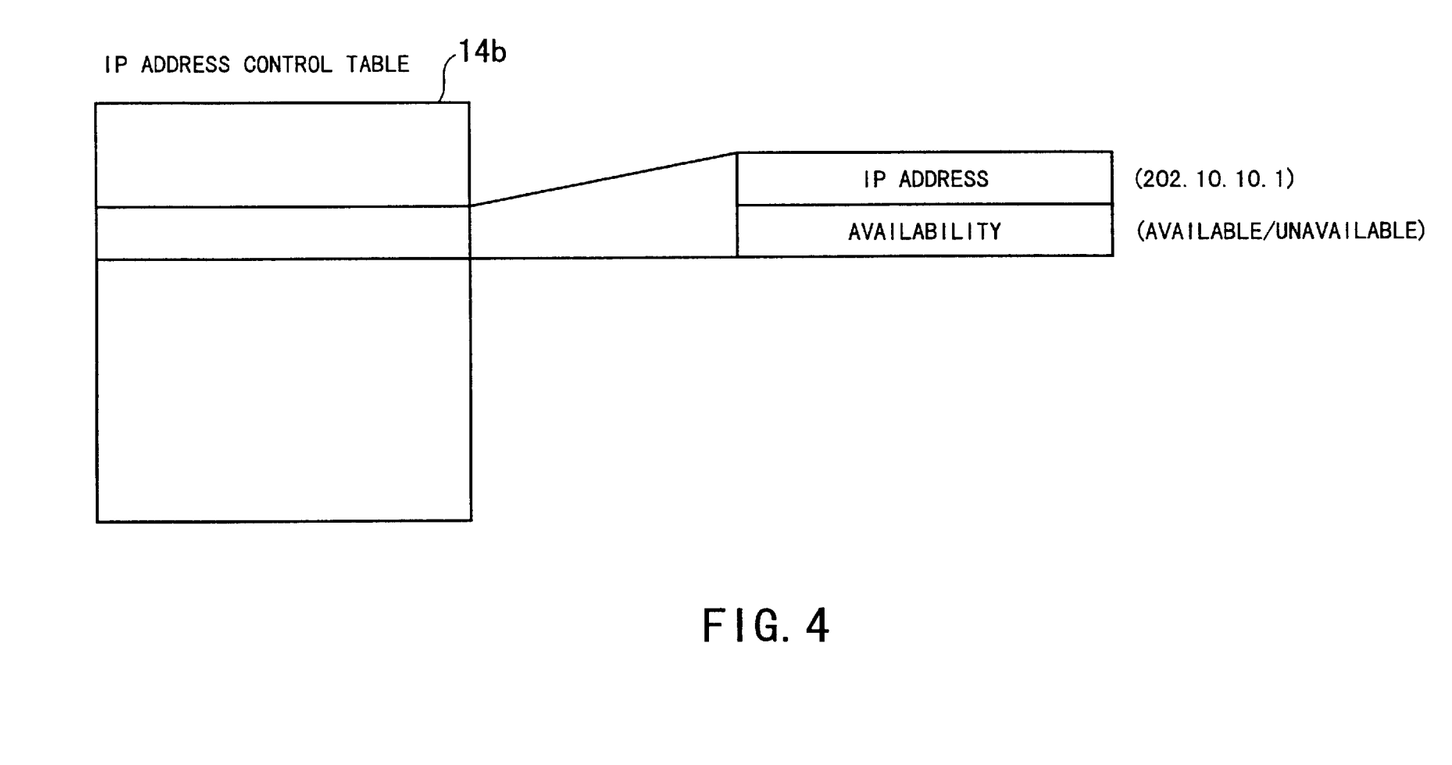
FIG. 4 is a diagram showing internal construction of an IP address control table.

FIG. 4 shows internal construction of the IP address control table 14b. More specifically, the IP address control table 14b contains entries of all the IP addresses allocated to the network 12, i.e. "202.10.10.1, 202.10.10.10, 202.10.10.11, 202.10.10.12, 202.10.10.13, 202.10.10.14", together with a availability of each IP address. When a terminal within the network 12 communicates with a terminal outside of the network 12, one of the IP addresses allocated to the network 12 is used. The availability of each IP address means whether or not each IP address is being used (unavailable) or being not used (available).

Figure 5:
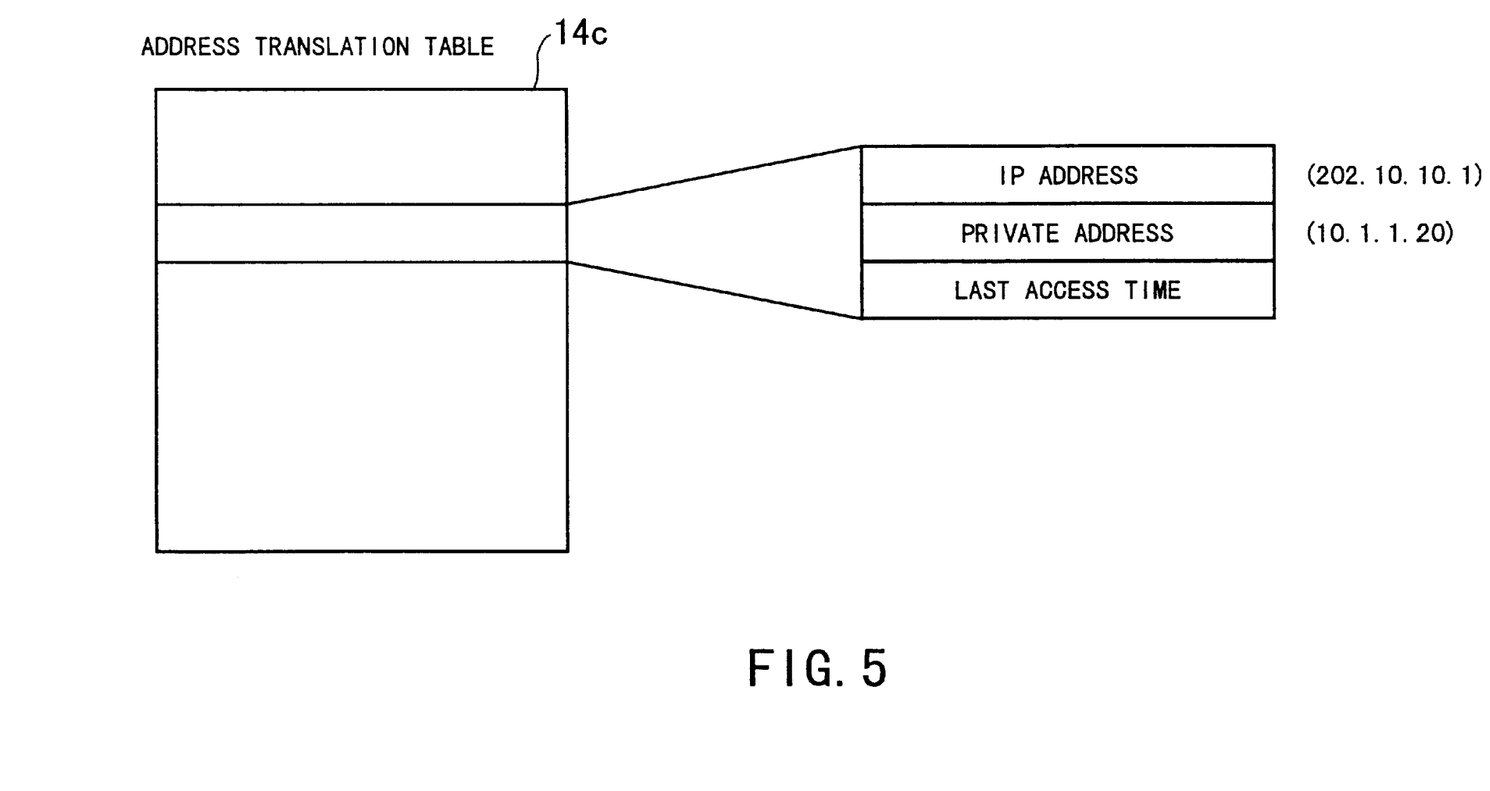
FIG. 5 is a diagram showing internal construction of an address translation table.

FIG. 5 shows internal construction of the address translation table 14c. More specifically, the address translation table 14c stores a correlation between the IP addresses allocated to the network 12 and the private addresses of the terminals located on the network 12, together with last access times. Details of these contents will be described when the processing operation of the address-translating device 14 is described with reference to FIGS. 6 and 7.

Figure 6:
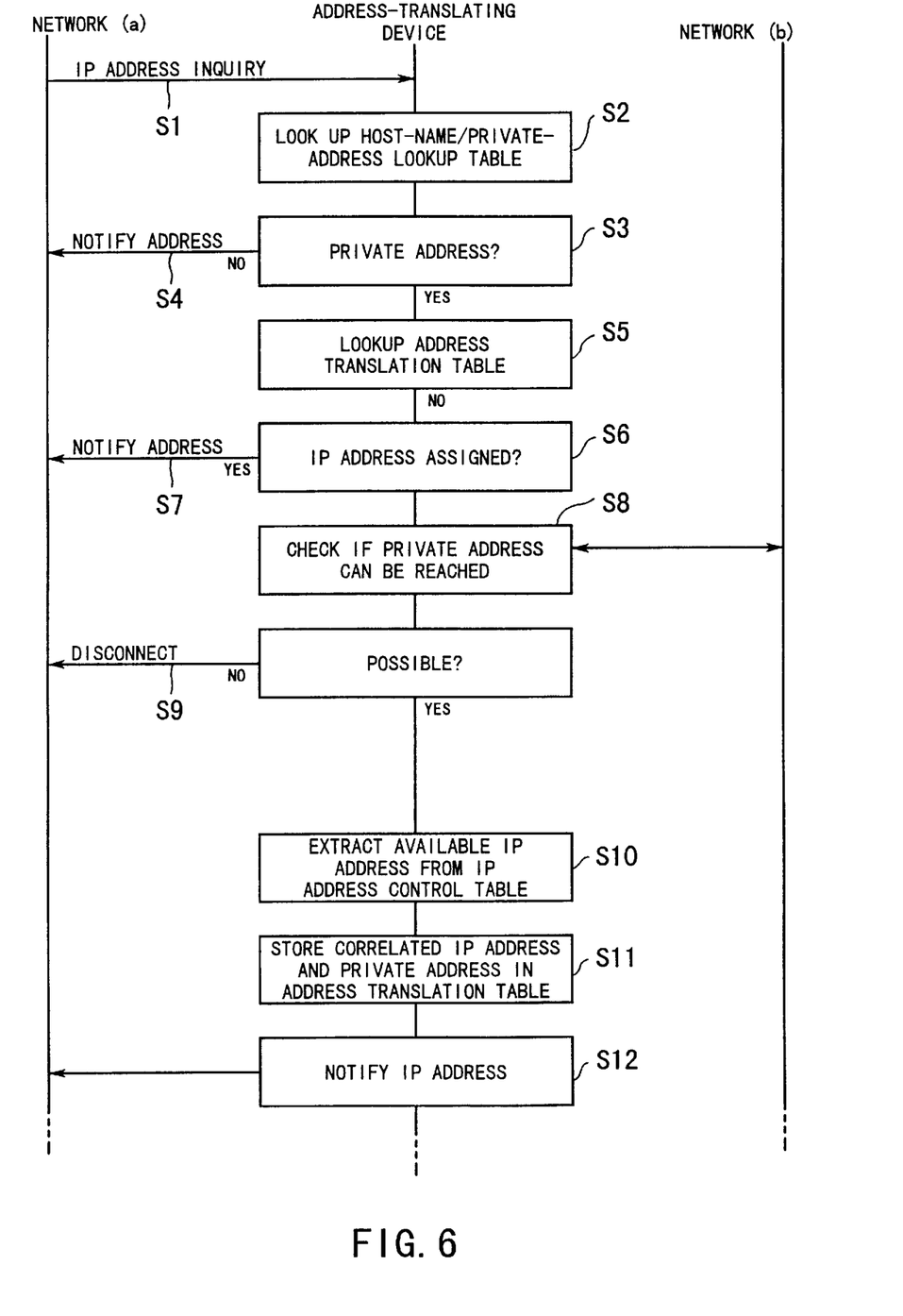
FIG. 6 is a sequence diagram showing a first half of processing operation of an address-translating device.
Figure 7:
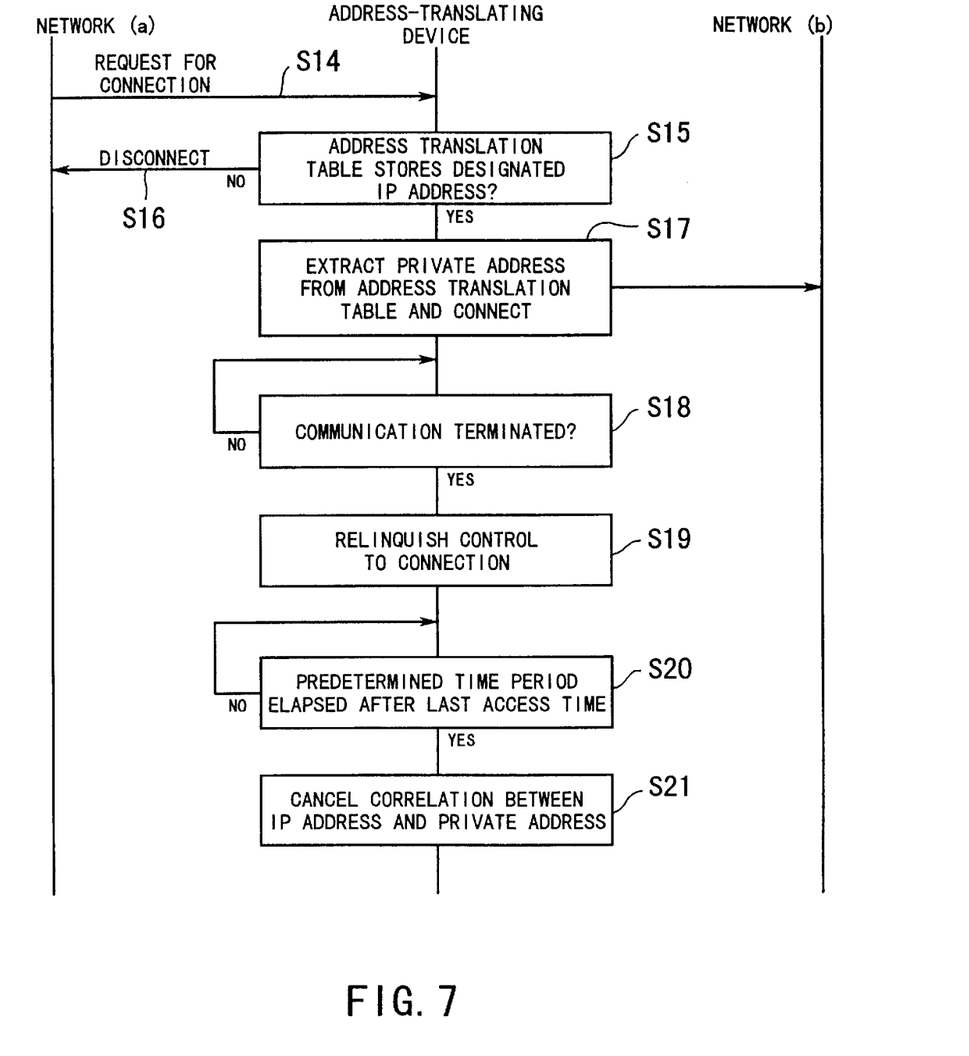
FIG. 7 is a sequence diagram showing a second half of the processing operation of the address-translating device.

FIGS. 6 and 7 are sequence diagrams showing the processing operation of the address-translating device 14. FIG. 6 shows a first half of the processing operation while FIG. 7 shows a second half of the same. Hereafter, details of the processing operation of the address-translating device 14 will be described referring to step (S) numbers shown in FIGS. 6 and 7.

When the terminal 11a on the network (a) 11 intends to communicate with the terminal 12a on the network (b) 12, first, the terminal 11a on the network (a) 11 inquires the address-translating device 14 as to an IP address of the terminal 12a by designating a host name "H1" thereof (S1).

Upon receipt of the inquiry, the address-translating device 14 looks up the host-name/private-address lookup table 14a to thereby retrieve the address "10.1.1.20" correlated to the designated host name "H1" (S2).

Then, it is determined whether or not the address "10.1.1.20" retrieved is a private address (S3). Normally, a private address is retrieved. However, if an IP address is assigned to the terminal 12a, the IP address is retrieved, and the retrieved IP address is directly notified to the terminal 11a on the network (a) 11a (S4). In such a case, a process for connection from the terminal 11a to the terminal 12a is carried out simply by using the IP address.

If the private address is retrieved, the address-translating device 14 looks up the address translation table 14c (S5) to determine whether or not the address translation table 14c stores or contains an entry of the retrieved private address "10.1.1.20" (S6). Initially, the address translation table 14c does not store the private address "10.1.1.20", and hence the answer to this question is negative, which means that no IP address is assigned to the private address "10.1.1.20", followed by the program proceeding to the following step S8. It should be noted that when the step S6 is executed after executing the following steps, the answer to the question of the step S6 becomes affirmative. In this case, the address-translating device 14 retrieves the IP address correlated to the private address "10.1.1.20" from the address translation table 14c, and notifies the terminal 11a on the network (a) 11 of the retrieved IP address. At the same time, the present time is entered in an area "last access time" corresponding to the private address "10.1.1.20" of the address translation table 14c. If there is already an entry of the last access time, the previous data is overwritten by the present data.

If the address translation table 14c does not store the private address "10.1.1.20" retrieved at the step S5, the address-translating device 14 sends out an Internet Control Message Protocol (ICMP) packet to the terminal 12a on the network (b) 12 (S8). The ICMP packet is sent to check whether the packet reaches the terminal 12a, and if the packet cannot reach the terminal 12a, the terminal 11a on the network (a) 11 is disconnected from the network (b) 12 (S9).

If the packet can reach the terminal 12a, the address-translating device 14 looks up the IP address control table 14b to thereby retrieve one available IP address, and an entry concerning the availability of the retrieved IP address is set to "unavailable" (S10). Then, the retrieved IP address (e.g. "202.10.10.1") is correlated to the private address "10.1.1.20" of the terminal 12a, and the correlated addresses are stored in the address translation table 14c. At the same time, the present time is entered into the area "last access time" corresponding to these correlated addresses (S11). Then, the retrieved IP address "202.10.10.1" is notified to the terminal 11a on the network (a) 11 (S12).

Next, when the terminal 11a on the network (a) 11 sends a request for communication with the terminal 12a to the address-translating device 14 by designating the notified IP address "202.10.10.1" (S14), the address-translating device 14 looks up the address translation table 14c (S15). If the address translation table 14c does not store or contain an entry of the IP address "202.10.10.1", the terminal 11a on the network (a) 11 is disconnected from the network (b) 12 (S16).

From the exemplified procedure described heretofore, the address translation table 14c contains the entry of the IP address as shown FIG. 5, and hence in this case, the address-translating device 14 reads out the private address "10.1.1.20" correlated to the designated IP address from the address translation table 14c. Then, using the private address "10.1.1.20", the terminal 11a on the network (a) 11 is connected to the network (b) 12 (S17). At the same time, the area "last access time" corresponding to the private address "10.1.1.20" in the address translation table 14c is overwritten by data of the present time.

The address-translating device 14 keeps track of the communication thus established between the terminal 11a on the network (a) 11 and the terminal 12a on the network (b) 12 (S18), and upon termination of the communication, the address-translating device 14 relinquishes control to the connection between the two terminals (S19). It should be noted that the term "connection" in this kind of context is intended to mean relay of packet transfer between the two terminals carried out by the address-translating device 14.

After relinquishing the control to the connection, the address-translating device 14 keeps track of the corresponding area "last access time" in the address translation table 14c to determines whether or not a predetermined time period (e.g. three minutes) has elapsed from the time entered in the area (S20). If the predetermined time period has elapsed, the address-translating device 14 deletes entries of the private address "10.1.1.20" and the IP address "202.10.10.1" as well as the time entered in the area "last access time" corresponding thereto from the address translation table 14c. Further, the entry concerning the availability of the IP address "202.10.10.1" in the IP address control table 14b is changed to "available" (S21).

Two steps identical to these steps S20 and S21 may be provided in a manner continuing from the step S12 in FIG. 6.

Thus, connection from the global network employing the IP addresses to a terminal on a local network employing private addresses is made possible, whereby the number of terminals located on the local network in a manner connectable from the global network at all becomes larger than the number of IP addresses allocated to the local network.

It should be noted that if any terminals exist on the local network, to which connection from the global network should be prohibited, the prohibition can be effected by not entering the host names of such terminals in the host-name/private-address lookup table 14a.

As described heretofore, according to the invention, when an inquiry made by designating a host name as to a global address is received from the first network using global addresses, the address-translating connection device correlates a private address of a terminal the host name of which is designated to an available one of the global addresses allocated to the second network, and stores the correlated addresses in a lookup table. At the same time, the address-translating connection device notifies the terminal on the first network of the global address. Thereafter, when the terminal on the first network makes a request for communication by designating the notified global address, the address-translating connection device looks up the lookup table to thereby retrieve the private address, and carries out connection of the terminal on the first network to the terminal on the second network, by using the retrieved private address.

As described above, when connections are made from the first network to terminals on the second network, the address-translating connection device dynamically assigns global addresses allocated to the second network to private addresses of the terminals on the second network. Therefore, the number of terminals within the second network to which connections can be made from the first network is not limited to the number of global addresses allocated to the second network. This realizes efficient use of address resources.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An address-translating connection device arranged between a first network using global addresses and a second network using private addresses, comprising:

host-name/private-address correlation storage means for correlating host names of terminals located on said second network to private addresses assigned to said terminals, respectively, and storing therein said host names and said private addresses correlated to each other;

global address control means for keeping track of availability of each of global addresses allocated to said second network;

address correlation/storage/translation means for correlating ones of said private addresses allocated to said terminals located on said second network respectively to ones of said global addresses allocated to said second network, and storing therein said ones of said private addresses and said ones of said global addresses correlated to each other;

private address-retrieving means for looking up said host-name/private-address correlation storage means to retrieve one of said private addresses correlated to one of said host names, when an inquiry made by designating said one of said host names as to one of said global addresses is received from said first network;

determining means for looking up said address correlation/storage/translation means to determine whether or not said address correlation/storage/translation means stores one of said global addresses which is correlated to said one of said private addresses retrieved by said private address-retrieving means;

storage-effecting means for looking up said global address control means to retrieve one of said global addresses which is available, correlating said one of said private addresses retrieved by said private address-retrieving means to said one of said global addresses which is available and retrieved, and causing said address correlation/storage/translation means to store therein said one of said private addresses and said one of said global addresses, which are correlated to each other, when said determining means has determined that said address correlation/storage/translation means does not store said one of said global addresses which is correlated to said one of said private addresses retrieved; and first notifying means for sending out into said first network a reply notifying said one of said global addresses which is caused to be stored in said address correlation/storage/translation means by said storage-effecting means;

wherein said storage-effecting means includes setting means for setting, in said global address control means keeping track of said availability of each of said global addresses, an entry concerning said availability of said one of said global addresses retrieved from said global address control means to "unavailable", when said storage-effecting means has correlated said one of said private addresses retrieved by said private address-retrieving means to said retrieved one of said global addresses, and caused said address correlation/storage/translation means to store therein said one of said private addresses and said one of said global addresses, which are correlated to each other; and wherein said address correlation/storage/translation means includes:

areas for storing times in a manner attached to respective pairs of said ones of said private addresses and said ones of said global addresses correlated to each other; and time-updating means for updating one of said times stored in one of said areas which is concerned with a looking-up operation by said determining means or a storing operation by said storage-effecting means, whenever said address correlation/storage/translation means is looked up by said determining means and whenever said address correlation/storage/translation is caused to store by said storage-effecting means, said address-translating connection device further including deletion/setting means for deleting one of said ones of said private addresses and one of said ones of said global addresses correlated to each other from said address correlation/storage/translation means when a predetermined time period has elapsed after a time stored in said one of said areas corresponding to said one of said ones of said private addresses and said one of said ones of said global addresses, and at the same time setting, in said global address control means keeping track of said availability of each of said global addresses, an entry concerning said availability of said one of said global addresses which is identical to said one of said ones of said global addresses deleted from said address correlation/storage/translation means, to "available".

2. An address-translating connection device according to claim 1, further including connection means for looking up said address correlation/storage/translation means to retrieve one of said private addresses correlated to one of said global addresses when a request made by designating said one of said global addresses for connection to one of said terminals on said second network is received from said first network, and carrying out a process for said connection to said one of said terminals which has said one of said private addresses correlated to said one of said global addresses and retrieved.

3. An address-translating connection device according to claim 1, including second notifying means for sending out a reply notifying said one of said global addresses, when said determining means has determined that said address correlation/storage/translation means stores said one of said global addresses which is correlated to said one of said private addresses.

4. An address-translating connection device according to claim 1, including checking means for checking whether or not it is possible to communicate with said terminal having said one of said private addresses retrieved by said private address-retrieving means, when said determining means has determined that said address correlation/storage/translation means does not stores said one of said global addresses which is correlated to said one of said private addresses retrieved by said private address-retrieving means, and wherein said storage-effecting means operates only when it is ensured through said checking by said checking means that it is possible to communicate with said terminal having said one of said private addresses retrieved by said private address-retrieving means.

* * * * *